April 22, 1969

J. S. ECKERT 3,440,018

CHEMICAL TREATING TOWER

Filed March 11, 1966

INVENTOR.
JOHN S. ECKERT
BY
ATTORNEY

April 22, 1969  J. S. ECKERT  3,440,018
CHEMICAL TREATING TOWER
Filed March 11, 1966  Sheet 2 of 2

INVENTOR.
JOHN S. ECKERT
BY
ATTORNEY

United States Patent Office 3,440,018
Patented Apr. 22, 1969

3,440,018
CHEMICAL TREATING TOWER
John S. Eckert, Silver Lake, Ohio, assignor, by mesne assignments, to U.S. Stoneware, Inc., a corporation of Massachusetts
Filed Mar. 11, 1966, Ser. No. 533,672
Int. Cl. B01j 1/00, 1/14; B01f 5/00
U.S. Cl. 23—283                                5 Claims

ABSTRACT OF THE DISCLOSURE

In a liquid vapor treating tower having liquid distributor means positioned near the top of the tower, mist-entrainment separator means, supported by the distributor means, defined by a foraminous element having an undulating cross section wherein the undulations are of substantially uniform amplitude and frequency.

This invention relates to a chemical treating tower having therein a mist-entrainment separator which entrains and agglomerates small mist particles carried upward by the gases, forming larger particles which drain back down through the tower.

Generally there is but a single entrainment separator in a tower. It is new to have the separator supported by the distributor through which liquid is spread over a packing bed in the tower, and thus it is new to provide a distributor with supporting means for the separator. This makes it unnecessary to supply special support means for the entrainment separator (or the base therefor) on the inner surface of a tower wall and across the area of the tower as is the present practice. It is also new to provide a base for the support of the separator which base is of an undulating or otherwise crooked cross section, with relatively closely spaced bottom peaks (sharp or rounded) to which the agglomerated mist droplets drain and from which they drop into the tower. In the preferred structure of this invention, the base is of this shape and rests on the distributor which includes special supports for this purpose.

The top of the usual distributor is not level. Ordinarily it includes a parting box or other supply conduit which feeds liquid to outwardly extending arms located at a lower level, or if the supply conduit and arms are circular in cross section even though the bottoms of the supply conduit and outwardly extending arms are on the same level, the supply conduit is of larger diameter so that its top is above the tops of the arms. Because the tops of various portions of these and other types of distributors are not level, it has not been customary to rest an entrainment separator on them, but it has been supported from the wall of the tower. According to this invention, supports are provided on the distributor to provide level support for the base on which the entrainment separator rests, even though such base be perfectly flat rather than undulated or otherwise irregular as in the preferred form of the invention.

Droplets which drip from a base for an entrainment separator which has an undulating or otherwise irregular surface, are drawn by gravity to separation areas at the bottom of the base which are relatively sharp or rounded peaks or areas at the bottom of the base from which the droplets separate because of the pull of gravity on them. This provides more uniform distribution of the droplets throughout the area of the tower than is possible with a flat base.

The invention is further described in connection with the accompanying drawings, in which.

Figure 1:
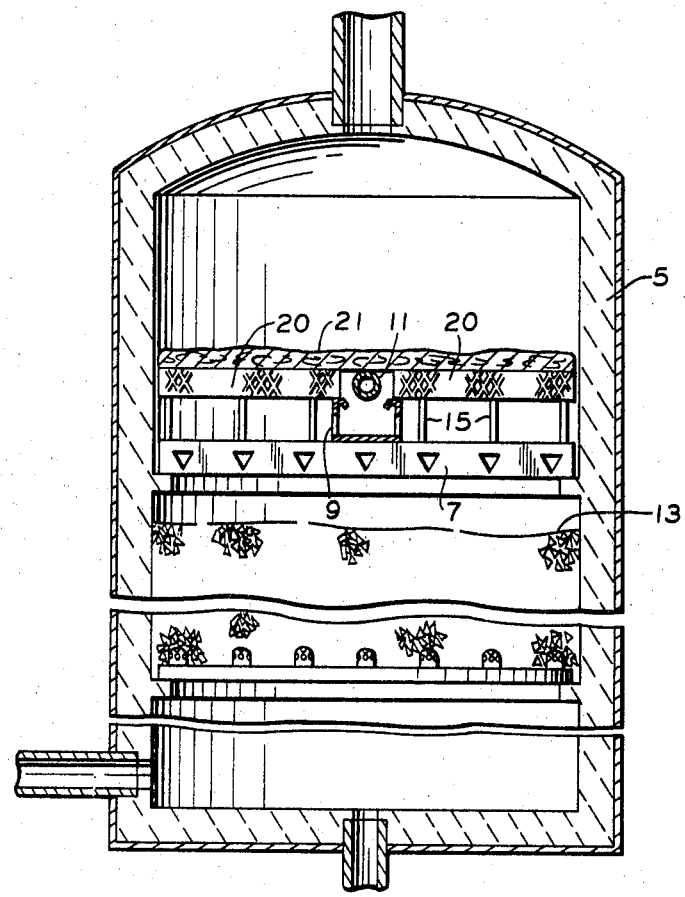
FIGURE 1 is a section through a tower showing a trough-type distributor with arms fed by a parting box with a feed pipe and a mist-entrainment separator which covers the entire inner area of the tower above the parting box and rests on a divided base.

The chemical treating tower 5 is provided at the bottom with a gas inlet and at the top with a gas outlet, and there is a liquid draw-off at the bottom. The mist-entrainment separator, etc. are located near the top of the tower. The arms 7 of the distributor rest on the shelf 8 and support the parting box 9. The perforated feed pipe 11 is located immediately above the parting box. The liquid may be fed to the parting box through its ends, thus eliminating the feed pipe. Any suitable means for supplying the liquid to the parting box may be used, and the distributor may be of any desired design. It spreads the liquid relatively uniformly over the packed bed 13.

The top of the parting box is at a much higher level than the tops of the arms 7, so saddles 15 are welded or otherwise fastened to the arms 7 to provide a level support for the base of the entrainment separator. As shown, the tops of the saddles 15 are the same height as the top of the parting box, although it is to be understood that they need not be as high as the top of the parting box or might be higher than the parting box. In the latter case, additional saddles or the like may be provided on the parting box to provide a level supporting surface for the separator base.

The bases for the mist-entrainment separators of the prior art have been flat. Such bases may be used in carrying out the invention, in which case they will be supported by the distributor and/or saddles or other supports rising from the distributor. However, the preferred base is of undulating cross section with sharp or rounded bends across its top and bottom.

The base 20 is porous and may be made of screens or the like but is preferably formed of expanded metal. It is supported by saddles 15, and may rest on the parting box. The openings through the base permit the rising gas to pass through it with little or no interference. By slanting the base surfaces, the total open area may be as great or substantially as great as the cross-sectional area of the tower so that the base does not impede gas flow.

The mist-carrying gases pass through the entrainment separator 21. Any type of entrainment separator may be used. Often these are composed of matted fibers, or they may comprise fine saddles or any equivalent. They may be equipped for electrostatic removal of the mist. The gases are usually cooled somewhat as they pass through the separator. A high percentage of the mist particles are entrained and agglomerated into larger droplets within the separator. These drip on to the base 20 and drip from the perforated bottoms 22 of the channels.

There is an opening between the two halves of the base (FIGURE 1) which accommodates the feed pipe 11. This opening may extend through the base, or a portion of the base may be cut away to provide a support for the feed pipe.

Figure 4:
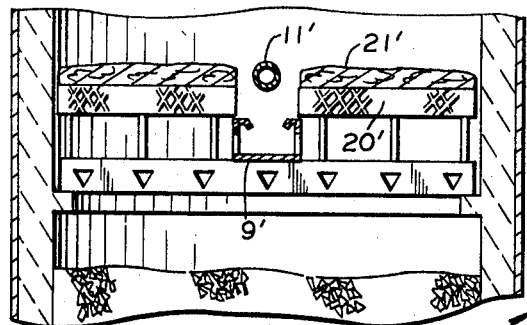
FIGURE 4 is a section through a tower showing a feed pipe located at a higher level and the mist-entrainment separator in two parts.

The gases pass up around the parting box so that there is not much need for an entrainment separator immediately above it. FIGURE 4 shows a separator 21' in two parts, one on each side of the feed pipe 11' which is located some little distance above the parting box 9'. The base 20' is shown in two parts, although it might be in a single piece which extends across the entire interior of the tower, below the feed pipe 11', in which case the arrangement of the base should be such that the feed liquor drains from the base into the parting box.

Although the flat surfaces of the base, as shown, come together in a sharp line, this is not necessary, as the troughs between the flat planes of the base may be rounded. Likewise, instead of the peaks being sharply pointed, they may be rounded. The peaks may be rounded and lead to sharply angled troughs across the bottom of the base. Generally a base of undulated cross section will be preferred as it is relatively cheap to manufacture, although theoretically it is possible that instead of the surfaces of the base draining to channels, they might drain to small openings in the bottom of individual pockets stamped or otherwise fabricated from a flat sheet.

Figure 2:
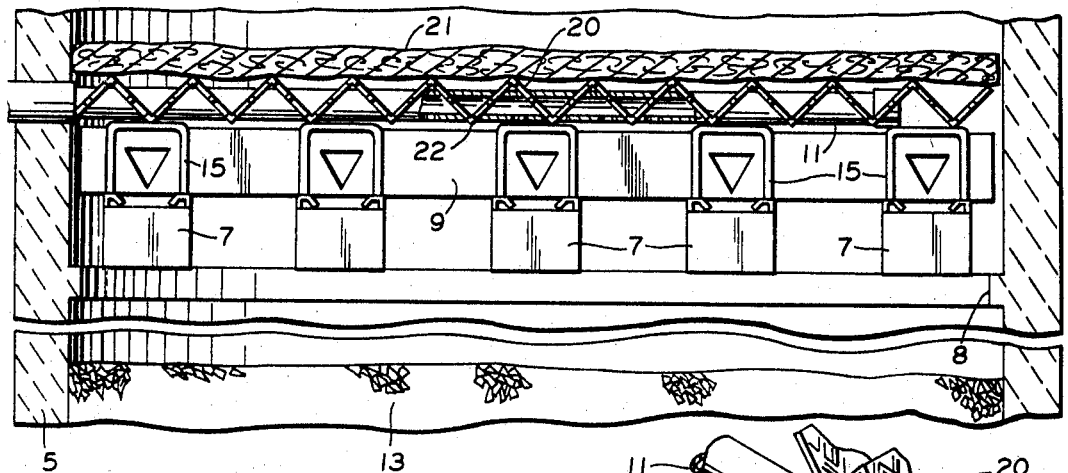
FIGURE 2 is a sectional detail of the arrangement shown in FIGURE 1, at right angles to FIGURE 1.
Figure 3:
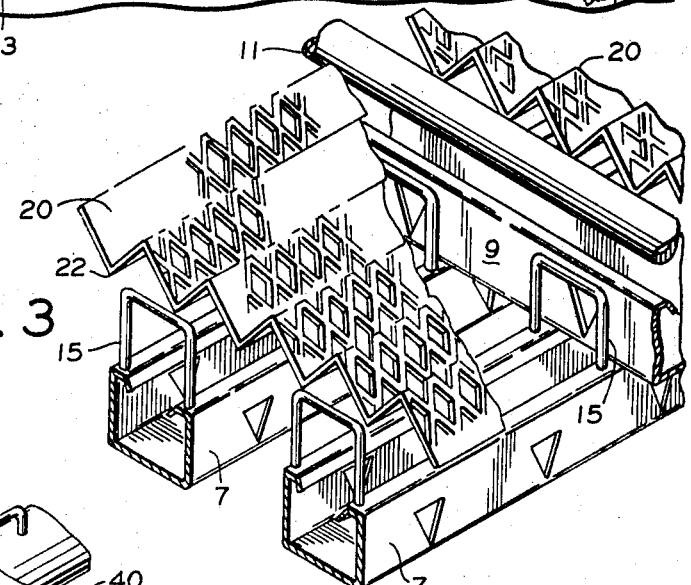
FIGURE 3 is a partial view of the same in perspective.
Figure 5:
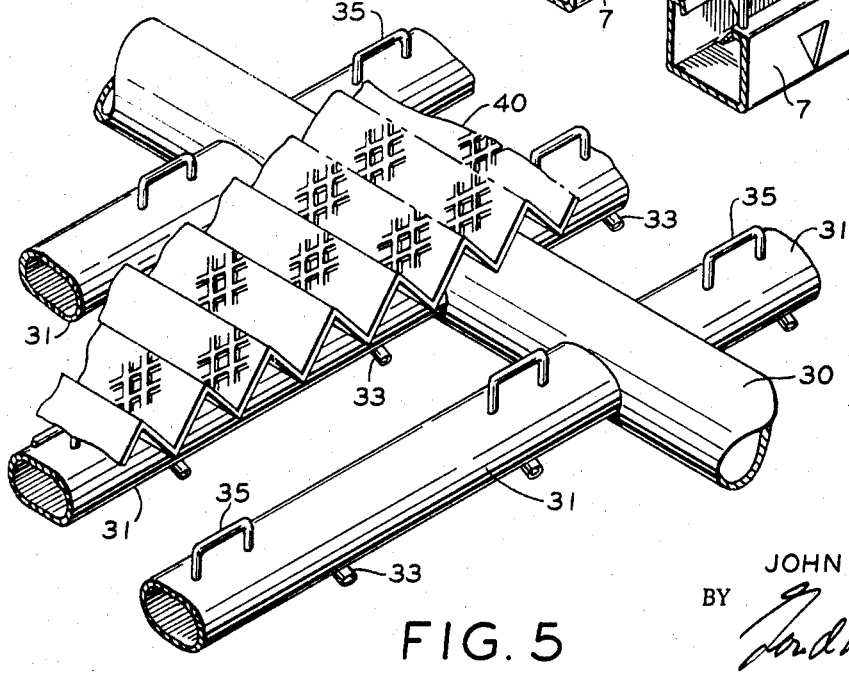
FIGURE 5 is a perspective view of a different type of distributor and a base for a mist-entrainment separator.

FIGURE 5 illustrates a distributor formed from conduits of circular cross sections. The central or feed conduit 30 is of larger diameter than the arms 31 which open into the feed conduit. The arms 31 are perforated along the bottom, and in the drawing velocity-reducing tubes 33 are shown as connected with each opening on the bottom of each arm, and there may be two or more such tubes extending away from one another in a generally downward direction from each opening in the bottom of each arm. Saddles 35 are welded to the tops of the arms and their tops are on the level with the top of the larger conduit 30. The separator base 40 is of the general type shown and discussed in connection with FIGURES 1 to 3.

Instead of saddles, posts or other means for supporting a separator base may be utilized.

It is desirable that the bottoms of the channels formed in the base be perforated at frequent intervals so that even though the base is not perfectly level there will be many separation points from which the agglomerated mist particles will drip into the tower.

The invention is covered in the claims which follow.

I claim:

1. In a liquid-vapor treating tower operative to provide counter-current contact between a liquid flowing down the tower and a vapor flowing up the tower: liquid feed distributor means positioned near the top of said tower and comprising a main liquid carrying member and a plurality of spaced, subsidiary liquid carrying members in liquid communication with said main liquid carrying member, and extending outwardly therefrom; and mist-entrainment separator means supported by and essentially coextensive with said liquid feed distributor means, said separator means comprising a foraminous element of undulating cross-section, wherein said undulations are of substantially uniform amplitude and frequency.

2. The arrangement as defined in claim 1 wherein said mist-entrainment separator means is formed of expanded metal.

3. The arrangement as defined in claim 1 wherein said main liquid carrying member is disposed at a higher elevation than said subsidiary liquid carrying members, and at least some of the latter are provided with support means which project upwardly to the level of said main liquid carrying member, said mist-entrainment separator means resting upon said support means.

4. The arrangement as defined in claim 3 wherein the frequency of said undulations is greater than the spacing between said subsidiary liquid carrying members.

5. The arrangement as defined in claim 4 wherein said mist-entrainment separator means is formed of expanded metal.

References Cited

UNITED STATES PATENTS

| | | | |
|---|---|---|---|
| 3,290,025 | 12/1966 | Engalitcheff | 261—140 |
| 3,099,696 | 7/1963 | Meek | 261—24 |
| 2,645,560 | 7/1953 | Otto | 55—257 XR |
| 2,437,484 | 3/1948 | Simons | 261—109 |
| 2,583,171 | 1/1952 | Green et al. | 55—444 |
| 2,437,484 | 3/1948 | Simons | 261—109 |
| 2,191,938 | 2/1940 | Mart | 261—111 |

JAMES H. TAYMAN, Jr. *Primary Examiner.*

U.S. Cl. X.R.

55—259, 486, 525; 261—106